3,806,483
STORAGE STABLE, ONE-PACKAGE, HEAT CURABLE, WATER BASED COMPOSITIONS USEFUL AS ADHESIVES, COATINGS, AND THE LIKE
Bernard Thomas Juba, White Bear Lake, and Rolf Bernd Schubert, St. Paul, Minn., assignors to H. B. Fuller Company, St. Paul, Minn.
No Drawing. Filed Nov. 1, 1971, Ser. No. 194,699
Int. Cl. C08g 45/04, 51/24
U.S. Cl. 260—29.6 NR                12 Claims

ABSTRACT OF THE DISCLOSURE

Storage stable, one-package, water based compositions useful as adhesives, coatings and binders are prepared by mixing together a water based emulsion polymer, a polyepoxide and a latent curing agent. The resulting compositions are stable in storage (e.g. up to six months or more at ambient temperatures). At the time of use, these compositions can be applied to a substrate, allowed to dry, and then cured or hardened by heating to an elevated temperature (e.g. heating for one-half hour at 120° C.). Alternately, these compositions can be applied to a substrate, allowed to dry and remain stored in their dry but uncured condition for several months, and then cured with the aid of heat.

BACKGROUND OF THE INVENTION

Polyepoxides have been used for some time in adhesive and coating compositions. Many such compositions are either 100% solids systems (i.e. they are diluent-free) or they are diluted with organic solvents (e.g. xylene). Although epoxy resins are used as a component of one-package, heat convertible compositions, they are more frequently used as one component of a multi-package adhesive, coating or binder system in which the epoxy resin and one or more co-reactants or curing agents for the epoxy resin are separated until the time of use. At the time of use, these components are mixed together, applied to an appropriate substrate, and allowed to harden by co-reaction at ambient temperature (e.g. 26° C.). Many two-package epoxy adhesives and two-package epoxy coating compositions (e.g. paints and varnishes) are known.

Simple epoxy-containing compositions, particularly the one-package, heat convertible systems, often suffer from the disadvantage that the final cured films, although generally excellent in adhesion to various substrates, tend to be stiff and brittle. Consequently, attempts have been made to flexibilize the epoxy resins. For example, solid elastomeric polymers can be mixed with an epoxy resin as long as the polymers are compatible with, but not reactive with, the epoxy resin or the curing agent. The incorporation of such flexibilizing solid elastomers often requires blending at elevated temperatures under prolonged agitation and the resultant epoxy resin-elastomer blends may be so high in viscosity that either organic solvents must be added as diluents or solvent-cut elastomeric polymers must be employed from the very start. The use of organic solvents, however, is expensive and it poses fire and pollution hazards.

Attempts have been made to prepare epoxy-based adhesives and coating compositions using water as a diluent. In this respect, see U.S. Pats. 3,316,187 and 3,316,195. According to such practices, certain polyepoxides and flexibilizing agents which are latices of polymers such as polyvinylbutyral are mixed with a catalyst or curing agent (e.g. a polyamide) shortly before use. The resulting compositions have a relatively short pot life and cure or harden at room or ambient temperature (e.g. 75° F.) by reaction among the various components.

Prior art compositions of this type (i.e. of the multiple-package type) suffer from the disadvantage that they require separate containers for the various co-reactants and require mixing at or shortly before the time of use. Furthermore, after being mixed, these compositions have relatively short pot lives and are not storage stable. For example, certain acid-cured epoxy paints have a useful pot life at room temperature of substantially less than 24 hours.

SUMMARY OF THE INVENTION

The present invention is storage stable, heat convertible, one-package, water based compositions which are useful as adhesives, coatings and binders (e.g. as a water resistant blocking or masking agent in silk screen processing).

In its simplest form, the compositions of the present invention contain: (1) a polyepoxide, preferably a bisphenol epichlorohydrin resin; (2) a compatible emulsion polymer, preferably a vinyl acetate copolymer; and (3) a latent curing agent such as dicyandiamide, all dispersed in water. Optionally and preferably, the composition will also include additive amounts of compatible additives of the type common to the adhesive and coating arts such as stabilizers (e.g. partially hydrolyzed polyvinyl alcohol), catalysts, heat curable phenolic resins, fillers, pigments, plasticizers, thickeners, dispersants, defoamers, dyes, co-catalysts, accelerators, tackifying resins, and the like.

DETAILED DESCRIPTION

The compositions of the present invention will typically contain at least 25% by weight of water (i.e. the compositions will have a solids content of up to 75% by weight). Generally, the water content will range between 40 and 70% by weight with the balance to 100% being the active ingredients and additives.

Polyepoxides

The epoxides useful in the present invention are the epoxides having at least two epoxy

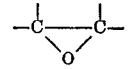

groups per molecule (i.e. they are polyepoxides). In general, the epoxide equivalent weight (i.e. the "EEW") will be less than 600, desirably less than 400 and preferably less than 250. These polyepoxides can be saturated or unsaturated, cyclic or acyclic, aliphatic, cycloaliphatic, aromatic or heterocyclic. They may contain substituents such as halogen, hydroxyl, ether, and the like.

One useful class of polyepoxides comprises the epoxy polyethers obtained by reacting an epihalohydrin (such as epichlorohydrin or epibromohydrin) with either a polyhydric phenol or a polyhydric alcohol. Suitable polyhydric phenols include, among others: resorcinol; catechol; hydroquinone; Cardanol bisphenol; 2,2 bis (hydroxyphenyl) propane (bisphenol A); 2,2 bis (4 hydroxy-phenol) butane; 4,4' dihydroxybenzophenone; bis (4-hydroxyphenyl) ethane; 2,2 bis (4 hydroxy-phenol) pentane and the like. Suitable polyhydric alcohol that can be reacted with an epihalohydrin to form epoxy polyethers are, among others, ethylene glycol, butylene glycol, sorbitol, propylene glycol, pentane diols, glycerol, pentaerythritol, polyethylene glycols, polyvinyl alcohol, polyhydric thioethers, mercapto alcohols, polyhydric alcohol partial esters, halogenated polyhydric alcohols, and the like. Preferred polyepoxides of this type are the resinous epoxy polyethers obtained by reacting dihydric phenols with epichlorohydrin in an alkaline medium. Alkalinity can be obtained by reaction with sodium hydroxide. These resins are well known and available from several suppliers in liquid and solid forms.

Another useful class of polyepoxides comprises the polyepoxy polyhydroxy polyethers obtained by reacting a polyhydric alcohol or polyhydric phenol with a polyepoxide. Such polyepoxides include the reaction product of glycerol and bis (2,3 epoxypropyl) ether, the reaction product of sorbitol and bis (2,3 epoxy-2-methylpropyl) ether, the reaction product of bis-phenol A and bis (2,3 epoxy-2-methyl propyl) ether, the reaction product of resorcinol and bis (2,3 epoxypropyl) ether.

Another class of polyepoxides consists of the epoxy novolac resins. These resins are obtained by reacting an epihalohydrin with the condensation product of aldehydes and monohydric or polyhydric phenols. A typical example is the reaction product of epichlorohydrin with a phenol-formaldehyde condensate.

Another class of polyepoxides comprises the polymers of epoxy-containing monomers possessing at least one polymerizable ethylenic linkage (e.g. glycidyl acrylate or glycidyl methacrylate). These monomers can be homopolymerized or can be copolymerized with one or more other ethylenically unsaturated monomers, such as styrene, vinyl acetate and the like. An example of such a polyepoxide is poly (vinyl 2,3 epoxypropyl ether).

Monomeric polyepoxides can also be used. Suitable monomeric polyepoxides include: 3,4 epoxycyclohexyl-methyl 3,4 epoxycyclohexane-carboxylate; bis (3,4 epoxycyclohexylmethyl) maleate; dicyclopentadiene oxide; epoxidized glycerol trioleate; epoxidized linseed oil; 1,8 bis (2,3 epoxypropoxy) octane; 1,4 bis (2,3 epoxypropoxy) benzene; 1,4 bis (2,3 epoxypropoxy) cyclohexane; 1,3 bis (4,5 epoxypentoxy) 5-chlorobenzene; 4,4 bis (2,3 epoxypropoxy) diphenol ether; and epoxy ethers of polybasic acids such as diglycidyl succinate, diglycidyl adipate, diglycidyl phthalate, diglycidyl maleate.

If desired, mixtures of various polyepoxides can be employed in the practice of the present invention. The total amount of polyepoxide used in the present composition will generally be at least 10% of the total weight of the aqueous composition although lesser amounts may sometimes be desired. More frequently, the amount of polyepoxide will be from 15–50% on the same basis. The weight ratio of polyepoxide to emulsion polymer solids will normally be from 2:1 to 1:6, a more preferred range being 1:2 to 1:1.

EMULSION POLYMERS

The emulsion polymers useful in the present invention are the thermoplastic polymers which are substantially free of reactive carboxyl and hydroxyl groups. They are made by emulsion polymerizing one or more monomers in water. Suitable monomers include ethylene, isobutylene, styrene, vinyl chloride, vinylidene chloride, acrylic and methacrylic esters, vinyl acetate, acrylonitrile, 1,3-butadiene, isoprene, chloroprene and the like. Thermosetting emulsion polymers have not proven satisfactory for use in this invention. Such polymers contain a large number of carboxyl, hydroxyl or other reactive groups which are not compatible with the polyepoxides and curing agents used herein.

The preferred emulsion polymers for use in this invention are the polymers (i.e. homopolymers and copolymers) of vinyl acetate, although other types of emulsion polymers can be used (e.g. ethyl acrylate/butyl acrylate copolymers).

Vinyl acetate emulsion polymers can be made by dispersing vinyl acetate alone or with one or more different monomers (e.g. ethyl acrylate) in water. The dispersing agent may consist of one or more surfactants with or without a hydrophilic protective colloid. A buffering agent such as sodium bicarbonate is generally employed to maintain the pH in an acid or neutral condition to prevent hydrolysis of vinyl acetate. A water soluble or dispersible reaction initiator is added to the emulsified monomer and heat is applied to start the polymerization. In practice, it is customary to begin the reaction in the presence of only a small fraction of the total monomers and then to feed the remaining monomers under controlled conditions and/or in controlled proportions or rates over a suitable length of time. The polymerization is continued until the conversion of monomers to polymer is essentially complete. After polymerization, the final pH can be adjusted, if necessary, to 4.5–5.5 to prevent hydrolysis of the vinyl acetate polymer. The final vinyl acetate emulsion polymer is usually milky white in appearance, but it may have a slight blue tinge and be semi-translucent. Commercial vinyl acetate emulsion polymers are generally supplied with a non-volatile content of 40–60%, but they may be as low as 20% or as high as 65%.

Polyvinyl acetate is a hard, brittle polymer which often has to be plasticized to be useful in adhesive and coatings applications. The glass transition temperature which is the temperature at which the polymer changes from a hard, glass-like material to a deformable plastic, is approximately 30° C. Consequently, the minimum film-forming temperature of a polyvinyl acetate homopolymer is close to room temperature and must be lowered for most applications. It is known in the art that vinyl acetate polymers can be flexibilized either by adding an external plasticizer such as dibutylphthalate or by copolymerizing vinyl acetate with another monomer which acts as an internal plasticizer. A number of co-monomers are being used commercially to internally plasticize vinyl acetate. Such co-monomers include the alkyl maleate and fumarate diesters, the $C_1$–$C_3$ alkyl esters of acrylic and methacrylic acids such as the ethyl-, butyl-, and 2-ethyl hexylesters; ethylene, vinyl versatate, alpha olefins, and the like. Most of these monomers will copolymerize with vinyl acetate at atmospheric pressure. However, superatmospheric pressure is required to copolymerize some systems such as vinyl acetate and ethylene.

Emulsion polymers of vinyl acetate can be divided into two broad classes. In the first class are those emulsion polymers which do not contain any protective colloid. These emulsions are generally stabilized by a combination of surfactants and a copolymerized acid such as acrylic acid. In the second class are those which contain a hydrophilic colloid. For adhesive use, a common choice of hydrophilic colloid is often partially hydrolyzed polyvinyl alchol. However, natural or synthetic gums, dextrines, hydroxyethylcellulose, and the like, can also be used.

CURING AGENTS

Suitable curing agents for use in the present invention are the compatible water soluble or water dispersible latent curing agents. "Latent curing agents" are those curing agents which do not cause any appreciable curing of the polyepoxide at ambient temperature, but which do cause curing or hardening of the polyepoxide when heated above 150° F. (e.g. heated at 250° F. for one-half hour). For purposes of ease in classification, the term "latent curing agent" as used herein denotes a curing agent which, at the intended use level, will not cause one pint of the one package, heat convertible system described herein to become unusable (in a practical sense) when stored at 76° F. for two weeks but which retains its ability to harden or cure the one package system when applied to a substrate and heated (e.g. heated to 300° F. for 90 minutes). The preferred curing agent is dicyandiamide. Other latent curing agents include the borontrifluoride complexes such as the monoethylamine complex of borontrifluoride, acid anhydrides such as dodecenyl succinic anhydride, and substituted guanidines such as diphenyl guanidine.

The amount of curing agent used will be an effective amount of up to 10 weight percent or more, usually less than 6 weight percent (e.g. 0.5 to 4 weight percent).

OTHER ADDITIVES

Other additives can be included in the aqueous compositions of the present invention. Such additives include: flexibilizing agents; fillers and pigments such as clay, asbestos, calcium carbonate, barytes, rutile titanium dioxide, aluminum and wood flour; stabilizers such as hydrolyzed polyvinyl alcohol; plasticizers such as dioctyl phthalate; tackifying resins such as the diglycerol ester of rosin; thickeners such as bentone; cocatalysts such as alkali metal hydroxides; dyes; coupling solvents; and the like, depending on the desired end use requirements.

The present invention is further illustrated by the following specific examples. Unless otherwise indicated, all parts and percentages are by weight.

EXAMPLE 1

This example illustrates the preparation of a storage stable, one-package, heat curable water based composition useful as both an adhesive and a coating vehicle.

Separate batches of this composition were prepared from the following ingredients in the proportions indicated by each of two procedures as hereinafter set forth.

Ingredient: Parts by weight
(1) Polyepoxide; a liquid epichlorohydrin/bisphenol A resin having an EEW of about 185 (hereinafter called "epoxy resin A") _____ 50
(2) Emulsion copolymer; 55% solids copolymer containing 85% vinyl acetate and 15% ethylene based on total monomer content (hereinafter called "emulsion copolymer A") _____ 100
(3) Latent curing agent; pulverized dicyandiamide _____ 2.5
(4) Water _____ 10

Procedure 1.—The dicyandiamide was dispersed in the epoxy resin under medium agitation. The blend was then subjected to 3 passes over a 3 roll mill to assure intimate dispersion since the dicyandiamide is not soluble in the epoxy resin. 52.5 parts of this blend were then added to 100 parts of the emulsion polymer A and mixed under medium agitation until the mixture was smooth. No particular precautions were taken. The epoxy resin/dicyandiamide dispersion blends into the emulsion polymer with a resulting viscosity rise, but with ease, comparable to that of admixing a common plasticizer such as dibutyl phthalate. 10 parts by weight of water were added to adjust the viscosity.

Procedure 2.—2.5 parts by weight of dicyandiamide were directly added to 100 parts by weight of the emulsion polymer and agitated under moderately high speed for 10 minutes at room temperature to achieve an adequate dispersion. Dicyandiamide has limited solubility in water which is supplied by the water content in the polymer emulsion. 50 parts by weight of the liquid epoxy resin were then blended into the emulsion polymer/dicyandiamide mix under medium agitation for 5 minutes. 10 parts by weight of water were added to adjust the viscosity.

The sample made by procedure 1 had an initial viscosity of 15,000 cps. at room temperature measured on a Brookfield rotational viscometer. The sample made by procedure 2 had a viscosity of 13,000 cps. when tested under the same conditions.

Supported films were made from both samples by drawing them down on ½ mil thick Mylar polyester film using a #30 Meyer wire wound rod. The coatings were allowed to dry at room temperature for 20 hours and examined for properties in their uncured state. Both films were white, translucent, uniform, hazy, soft and tacky and could easily be scratched with a fingernail. Both films were then subjected to a one hour oven cure at 350° F. and examined for their film properties. Both cured films were off-white, opaque, flexible and tough. They could not be scratched with a fingernail and did not break when creased.

Both samples were then coated on pairs of 0.063 inch thick, one inch wide 2043T3 aluminum strips which had previously been acid etched according to ASTM D-2648, Method C. The coated aluminum was allowed to dry at room temperature for 2 hours. The coated pieces were then mated with an overlap of ½ square inch under a pressure of 15 p.s.i. The resulting lap bonded specimens were subjected to an oven cure of 350° F. for 90 minutes, subsequently conditioned at 75° F. and 50% relative humidity for 10-20 hours and then ruptured in tensile shear on an Instron tester at a jaw separation rate of 0.05 inch per minute (see ASTM D-1002). The sample made according to procedure 1 gave an average tensile/shear strength of 1580 p.s.i.; the sample made according to procedure 2 gave an average tensile/shear strength of 1760 p.s.i.

Climbing drum peel specimens with both samples were prepared in a similar manner and subjected to an oven cure of 350° F. for 90 minutes. 20243T3 aluminum was used with the thin member 0.02 inch thick and the rigid member 0.25 inch thick. The substrates were previously acid etched and then tested per ASTM D-1781 on an Instron tester. The sample made according to procedure 1 gave an average peel strength per inch width of 78 pounds and the sample of procedure 2 an average of 77 pounds per inch of width.

T peel specimens were similarly prepared and cured under the conditions as previously described. The test was run on acid etched 1100H14 type aluminum according to MMM-A-132. The sample of procedure 1 failed at an average of 16 pounds per inch width and the sample of procedure 2 failed at an average of 19 pounds per inch width.

After both samples had been stored on a laboratory bench at ambient temperature conditions in closed containers for three months, they were inspected. They were still fluid, showed no signs of coagulation, and when retested in the tensile/shear test run on specimens made from the stored material, gave values of 1650 p.s.i. for the sample of procedure 1 and 1700 p.s.i. for the sample of procedure 2.

The aqueous compositions of Examples 2-22 were all prepared according to procedure 2 of Example 1 and tested, as in Example 1.

EXAMPLES 2-4

|  | Parts by weight | | |
|---|---|---|---|
| Example No. | 2 | 3 | 4 |
| Copolymer A | 100 | 100 | 100. |
| Epoxy resin A | 10 | 30 | 75. |
| Dicyandiamide | 0.5 | 1.5 | 3.8. |
| Water |  |  | 20. |
| Initial Brookfield viscosity | 4,300 cps | 30,000 cps | 5,000 cps. |
| Dry film before cure | Transparent. White. Soft. Slightly tacky. | Translucent. White. V. soft. Tacky. | Translucent. White. V. soft. V. tacky. |
| Dry film after oven cure | Transparent with haze. Beige. Tough. Non-tacky. V. flexible. | Opaque. Off-white. Tough. Non-tacky. Flexible. | Opaque. Off-white. V. tough. Non-tacky. Flexible. |
| Tensile/shear, p.s.i. | 996 | 1,342 | 1,623. |
| Climbing drum peel, lb. per inch width | 85 | 65 | 49. |

All wet samples were still liquid and showed no signs of coagulation after 3 months aging in closed containers at room temperature.

Example 4 showed some seeding of dicyandiamide on the bottom of the container after three months storage which was easily removed with 2 minutes of agitation.

For purposes of comparison, the following control samples were prepared and tested in the same manner with the results as indicated.

| Control | Parts by weight | | |
|---|---|---|---|
| | A | B | C[1] |
| Emulsion polymer A | 100 | 100 | |
| Epoxy resin A | | 50 | 100. |
| Dicyandiamide | | | 5. |
| Dry, uncured film | Transparent. White. Sl. tacky. Soft. V. flexible. | Transparent. W. haze, white. Tacky. V. soft. V. weak. | Viscous liquid. |
| Cured film | Transparent. Brown. V. tacky. Soft. V. flexible. | Transparent. W. haze, off-white. V. tacky. Soft. V. weak. | Transparent. Amber. Non-tacky. V. brittle. |
| Tensile/shear, p.s.i. | 552 | 90 | 2,329. |
| T peel | 19 | 2 | 7. |

[1] Made by milling dicyandiamide into the epoxy resin.

EXAMPLES 5–9

| Example number | Parts by weight | | | | |
|---|---|---|---|---|---|
| | 5 | 6 | 7 | 8 | 9 |
| Emulsion polymer A | 100 | 100 | 100 | 100 | 100 |
| Epoxy resin A | 50 | 50 | 50 | 50 | 50 |
| Dicyandiamide | 2.5 | 2.5 | 2.5 | 2.5 | 2.5 |
| Co-catalyst [1] | 1.0 | 2.0 | 2.5 | 3.0 | 4.0 |
| Water | 10 | 10 | 10 | 10 | 10 |
| Tensile/shear,[2] p.s.i. | 1,100 | 1,740 | 1,810 | 1,807 | 1,660 |
| Climbing drum peel,[2] lb. per in. width | 54 | 64 | 85 | 63 | 59 |

[1] Co-catalyst, 3-(parachlorophenyl)-1-dimethyl urea, was blended into the emulsion with the dicyandiamide with moderately fast agitation.
[2] All specimens cured at 275° F. for 90 min.

All samples were still fluid after two months aging at room temperature. Some showed seeding out of co-catalyst and dicyandiamide on the bottom of their respective containers, particularly Examples 8 and 9; this was removed by agitation for several minutes.

EXAMPLES 14–18

| Example number | Parts by weight | | | | |
|---|---|---|---|---|---|
| | 14 | 15 | 16 | 17 | 18 |
| Emulsion polymer A | 100 | 100 | 100 | 100 | 100 |
| Shell epoxy resin Epon 1001 [a] | 30 | | | | |
| Shell epoxy resin Epon 812 | | 30 | | | |
| Dow epoxy resin DER 3599X | | | 30 | | |
| Dow epoxy resin DER 542 [a] | | | | 30 | |
| Ciba epoxy resin CY 178 | | | | | 30 |
| Dicyandiamide | 0.7 | 1.5 | 1.5 | 1.0 | 1.5 |
| Methylethyl ketone (MEK) | 30 | | | | 30 |
| Initial Brookfield viscosity, cps. | 18,700 | 1,550 | 12,000 | 41,000 | 72,000 |
| Tensile/shear, p.s.i. | 967 | 517 | 803 | 572 | 629 |
| T peel (lb. per in. width) | 25 | 15 | 17 | 14 | 12 |
| Brookfield viscosity on samples aged for 2 months | 17,500 | 920 | 23,000 | 40,000 | 65,000 |

[a] Dissolved in MEK and then added.

NOTES REGARDING EXAMPLES 14–18

Example 14

"Epon" 1001 (trademark of Shell Oil Company) is an epichlorohydrin/bisphenol A-type solid epoxy resin with a melting point of 65°–75° C. (Duran's Mercury Method), an average molecular weight of 900, and an epoxide equivalent weight (EEW) of 450–550.

Example 15

"Epon" 812 (trademark of Shell Oil Company) is a mixture of di- and tri-epoxides made by the condensation of epichlorohydrin and glycerin. The resin has an epoxide functionality of 2.2, an average molecular weight of 306, and an EEW of 140–160.

Example 16

Dow epoxy resin "DER 3599X" is an epoxy resin having an EEW of 225 to 250.

Example 17

Dow epoxy resin "DER 542" is a semi-solid epoxy resin (softening point 51–61° C.) having an EEW of 350–400.

Example 18

Ciba epoxy resin "CY 178" is a cycloaliphatic (3,4-epoxy cyclohexyl-type) epoxy resin having an EEW of 213.

EXAMPLES 10–13

| Example number | Parts by weight | | | |
|---|---|---|---|---|
| | 10 | 11 | 12 | 13 |
| Emulsion polymer A | 100 | 100 | 100 | 100. |
| Epoxy resin A | 30 | 30 | 30 | 30. |
| BF$_3$-MEA complex | 1.0 | | | |
| Diphenyl guanidene | | 5.0 | 10.0 | |
| Dodecenyl succinic anhydride | | | | 30.0 |
| Water | 15 | 10 | 10 | |
| Tensile/shear, p.s.i. | 761 | 1,780 | 1,507 | 1,150. |
| T peel (lb. per in. width) | 15 | 32 | 28 | 26. |
| Dry, uncured film | Transparent. White. Slightly tacky. Soft, rubbery. | Transparent. White. Slightly tacky. Soft, rubbery. | Transparent to opaque. White. Sl. tacky. Soft. | Transparent. White. Press. Sens. |
| Cured film | Transparent. White. Tough. Rubbery. Non-tacky. | Transparent. Off-white. Tough. V. flexible. V. sl. tacky. | Transparent to opaque. Beige. V. tough. Flexible. Hard. | Transparent. Off-white. Tough. Rubbery. Tacky. |

After two months aging at room temperature, all samples were still fluid and smooth. However, Example 12 required agitation to remove sediment from the bottom of the container.

All aged samples were fluid and smooth after two months. All cured films were uniform, tough, difficult to scratch and did not break when creased sharply.

EXAMPLES 19-23 [1]

| Example number | 19 | 20 | 21 | 22 |
|---|---|---|---|---|
| Vinyl acetate/alkyl maleate (Daratak B) | 100 | | | |
| Vinyl acetate/2 ethyl hexyl acrylate [2] | | 100 | | |
| Vinyl acetate/2 ethyl hexyl acrylate [3] | | | 100 | |
| Polyvinyl acetate homopolymer | | | | 100 |
| Epoxy resin A | 30 | 30 | 50 | 50 |
| Dicyandiamide | 1.5 | 1.5 | 1.5 | 1.5 |
| Dioctyl phthalate | | | | 20 |
| Tensile/shear, p.s.i. | 1,960 | 1,433 | 147 | 1,227 |

[1] All emulsion polymers were about 55% solids.
[2] About 73 weight percent vinyl acetate and 27 weight percent 2-ethyl hexyl acrylate (monomer basis).
[3] About 40.5 weight percent vinyl acetate and 59.5 weight percent 2-ethyl hexyl acrylate.

EXAMPLE 23

| | Parts by weight |
|---|---|
| Emulsion polymer A | 100 |
| Epoxy resin A | 50 |
| Dicyandiamide | 2.5 |
| Kaolin clay | 2.5 |
| Titanium dioxide | 5 |
| Water | 20 |

This formulation was blended under high speed agitation for 20 minutes, coated on Mylar film, allowed to dry and cured at 350° F. for 90 minutes. The product cured to an off-white, opaque, tough and flexible coating. After the wet sample had been allowed to age for two months at room temperautre, it was still fluid and smooth. It was agitated under moderate speed for 5 minutes, again drawn down on both Mylar and aluminum, allowed to dry and cure as before. Again the films were uniform, tough and flexible.

EXAMPLE 24

25 parts of water were mixed with 1.1 parts of dicyandiamide, 0.2 part of defoamer and 7 parts of partially hydrolyzed polyvinyl alcohol. The blend was heated to 190° F. under agitation, held at that temperature for 20 minutes and then cooled to 120° F. Next, 13 parts of liquid bisphenol A/epichlorohydrin resin (epoxy resin A) were added and mixing was continued until a smooth blend resulted. Next, 36 parts of emulsion polymer A were blended into the mix. Finally, 11.8 parts of water were added.

Cured thin films of this formulation were opaque, tough and flexible, had excellent water resistance. They exhibited good adhesion to metal substrates. This formulation was storage stable for six months without adversely affecting its performance.

EXAMPLE 25

The composition of Example 13 was drawn down on Mylar film and allowed to dry for 20 hours at room temperature. The uncured coating was then stored for three months under ambient conditions. At the end of the aging period, sections of the coated Mylar were cut out and mated to aluminum under a pressure of 15 p.s.i. followed by a cure of 350° F. for one hour. The cured specimen was then allowed to cool to room temperature. When the aluminum and Mylar were pulled apart manually, the Mylar film tore.

The same formulation was coated on aluminum and allowed to dry for 48 hours at room temperature. The uncured, coated substrate was then contacted with an uncoated sheet of aluminum under manual pressure. The dried coating had enough pressure sensitivity to wet out the uncoated aluminum and provide a bond strong enough to allow subsequent handling of the bonded sample, such as placing it in the oven for curing.

From the foregoing examples, it can be appreciated that a versatile, one package, storage stable, heat convertible, aqueous composition has been developed which can be altered in composition to meet differing needs (e.g. as adhesives, coating vehicles, binders, etc.). However, it can be appreciated that all combinations of ingredients do not serve with equal effectiveness and that every combination of ingredients should be adjusted to reach optimum performance.

What is claimed is:

1. A storage stable, heat-convertible, one-package water-based composition consisting essentially of:
   (a) at least 25% by weight of water;
   (b) at least 10% by weight but less than 50% by weight of polyepoxide having an epoxide equivalent weight of less than 600; the epoxides of said polyepoxide being vicinal epoxide rings;
   (c) thermoplastic vinyl acetate polymer dispersed in said water, the weight ratio of polyepoxide to vinyl acetate polymer being from 2:1 to 1:6; and
   (d) an effective amount of a latent curing agent sufficient to cure or harden said polyepoxide at temperatures in excess of 150° F., said effective amount being less than 10% by weight of said water-based composition and less than 6 parts by weight for each 50 parts by weight of said polyepoxide.

2. A composition according to claim 1 wherein said latent curing agent comprises dicyandiamide.

3. A composition according to claim 2 wherein the said vinyl acetate polymer comprises a vinyl acetate/ethylene copolymer.

4. A composition according to claim 3 wherein the polyepoxide comprises a liquid epichlorohydrin/bisphenol A resin having an epoxide equivalent weight of less than 250.

5. A composition according to claim 2 wherein said composition comprises:
   40–70% by weight of water, at least about 15% by weight of said vinyl acetate polymer,
   at least about 15% by weight of said polyepoxide, and up to about 4% by weight of said latent curing agent.

6. A composition according to claim 2 wherein the ratio of polyepoxide to vinyl acetate polymer is from 1:2 to about 1:1.

7. A composition according to claim 2 wherein the balance of said composition, up to 75% by weight, consists essentially of solids.

8. A composition according to claim 2 wherein the amount of polyepoxide is from 15 to 50% by weight and the epoxide equivalent weight is less than 400.

9. A composition according to claim 1 wherein said latent curing agent is a boron trifluoride complex.

10. A composition according to claim 1 wherein said latent curing agent comprises diphenyl guanidene.

11. A composition according to claim 1 wherein said latent curing agent comprises dodecenyl succinic anhydride.

12. Supported film consisting essentially of the composition of claim 11 which has been cured.

References Cited

UNITED STATES PATENTS

| | | | |
|---|---|---|---|
| 2,784,128 | 3/1957 | Schroeder | 260—837 R |
| 3,449,280 | 6/1969 | Frigstad | 260—29.2 |
| 3,316,195 | 4/1967 | Grosner | 260—29.2 X |

WILLIAM H. SHORT, Primary Examiner

T. PERTILLA, Assistant Examiner

U.S. Cl. X.R.

101—121; 106—170; 117—132 BE, 138.8 F, 161 ZB; 252—302; 260—4 R, 17 R, 17.4 R, 18 PF, 24, 31.8 Ep, 32.8 Ep, 37 Ep, 45.95, 47 Ep, 836, 837 R, 837 N

UNITED STATES PATENT OFFICE
CERTIFICATE OF CORRECTION

Patent No. 3,806,483                    Dated April 23, 1974

Inventor(s) Bernard Thomas Juba and Rolf Bernd Schubert

It is certified that error appears in the above-identified patent and that said Letters Patent are hereby corrected as shown below:

In column 4, line 45, "$C_1-C_3$" should read --$C_1-C_8$--.

In column 5, line 21, "a" should read --as--.

In column 8, line 21, "Duran's" should read --Durran's--; and

In column 10, line 57, (Claim 12, second line), "claim 11" should read --claim 1--.

Signed and sealed this 10th day of September 1974.

(SEAL)
Attest:

McCOY M. GIBSON, JR.                    C. MARSAHLL DANN
Attesting Officer                        Commissioner of Patents